Nov. 26, 1929.   P. H. DAVIS   1,737,150
CONVEYER BELT FOR WASHING MACHINES AND THE LIKE
Filed Oct. 27, 1928
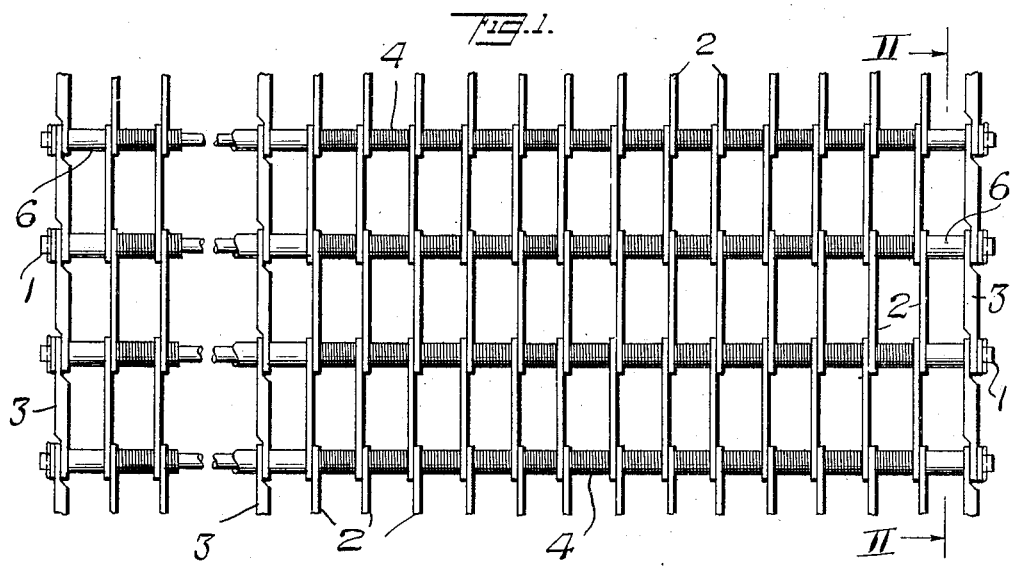
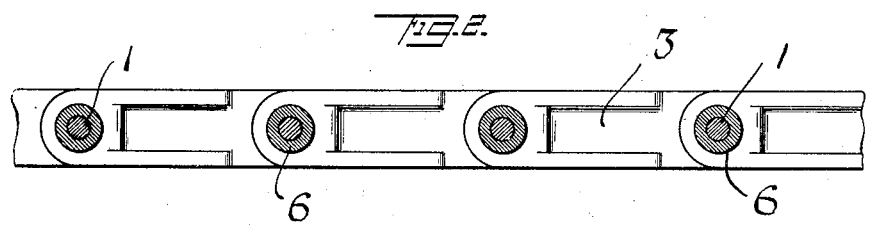
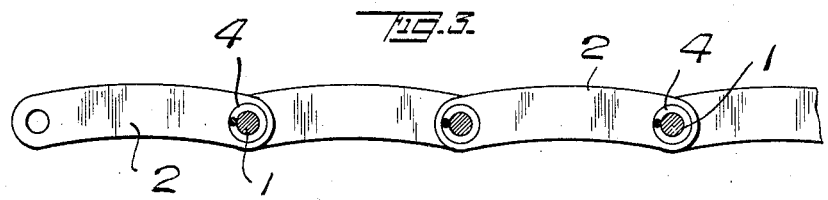
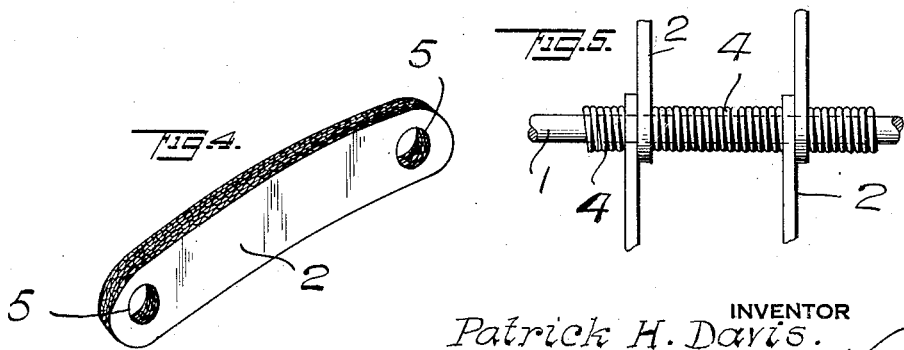
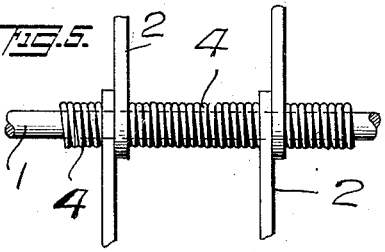
INVENTOR
Patrick H. Davis.
BY
Wm Wallace White
ATTORNEY Patented Nov. 26, 1929

1,737,150

UNITED STATES PATENT OFFICE

PATRICK HENRY DAVIS, OF LEONIA, NEW JERSEY

CONVEYER BELT FOR WASHING MACHINES AND THE LIKE

Application filed October 27, 1928, Serial No. 315,407, and in Great Britain August 21, 1928.

My invention relates to dish-washing and like machines of the type in which the dishes or other articles are placed upon a link belt conveyer which carries them through the washing fluid or the like.

One object of my invention is the provision of an improved belt having spring spacing members interposed between the links thereof.

Another object of the invention is to provide helical spacers between impregnated fabric links.

With these and other objects in view the invention consists in the novel construction and arrangement of parts hereinafter described, illustrated in the accompanying drawings, and particularly pointed out in the appended claims, it being understood that various changes in the constructional details may be made without departing from the spirit of the invention or sacrificing any of the advantages thereof.

In the drawings Figure 1 is a plan view of a section of the link belt embodying my invention;

Fig. 2 is a section taken on the line 2—2 of Fig. 1;

Fig. 3 is a section taken through the sleeves or spacing devices;

Fig. 4 is a perspective view of a link; and

Fig. 5 is a detail view showing a portion of the link belt on a larger scale.

Referring to these drawings, the link belt mechanism comprises a plurality of rods 1 arranged transversely and upon which are mounted dish-carrying links 2 and driving links 3 held in suitable laterally spaced relationship by spring sleeves or spacing devices 4 of helical form on the rods 1.

The driving links 3 are preferably of bronze, or other rustless metal suitable for carrying the driving load, and are perforated at each end to receive the rods 1, the engagement between the link and rod being a running fit. The driving links 3 are preferably arranged at each end of the rods 1, that is to say, at the sides of the conveyer belt, and if a wide conveyer is used, one or more intermediate rows of driving links may be used, as shown for example at Fig. 1.

The dish-carrying links 2 may be formed of layers of fabric such as canvas, impregnated with a material capable of rendering the link relatively rigid and waterproof, and able to withstand the heat of boiling water. Examples of such materials are rubber vulcanized hard, or bakelite. These links are preferably made by preparing sheets comprising several layers of fabric with the impregnating material and then stamping out the links in the desired form, holes 5 being preferably simultaneously stamped at each end to fit the cross rods 1.

The sleeves or spacing devices 4 bear closely against the faces of the links 2 and the spring action prevents looseness and permanently ensures the proper assembly and co-operation of said links in spite of wear at the joints.

Between the driving links 3 and the adjacent links 2 tubular spacing members 6 may be interposed.

Although the drawing and the above specification disclose the best mode in which I have contemplated embodying my invention, I desire to be in no way limited to the details of such disclosure, for, in the further practical application of my invention, many changes in form and construction may be made, as circumstances require or experience suggests, without departing from the spirit of the invention within the scope of the appended claims.

I claim:

1. A travelling conveyer belt for a machine of the character described comprising a series of transverse rods, a series of soft links carried by said rods, and spring spacing devices interposed between said links.

2. A travelling conveyer belt for a machine of the character described comprising a series of transverse rods, a series of impregnated fabric links mounted on said rods, and spring spacing devices interposed between the links and fitting closely upon said rods.

3. A travelling conveyer belt for a machine of the character described comprising a series of transverse rods, a series of soft links mounted on said rods, and helical spring spacers fitting closely upon the rods and interposed between the links.

4. A travelling conveyer belt for a machine of the character described comprising a series of transverse rods a series of helical spring spacers fitting closely upon said rods, and a series of links interposed between the said spacers and each comprising a plurality of layers of canvas impregnated with hard rubber.

5. A travelling conveyer belt for a machine of the character described comprising a series of transverse rods, a series of soft links carried by said rods, a series of strong driving links also carried by said rods, and spring spacing devices interposed between the soft links and closely engaging said rods.

6. A travelling conveyer belt for a machine of the character described comprising a series of transverse rods, a series of impregnated canvas links and metallic links, and hedical spring spacers engaging said rods and interposed between said canvas links.

In testimony whereof I have signed my name to this specification.

PATRICK HENRY DAVIS.